S. C. HILLS.
LOCKING DEVICE.
APPLICATION FILED NOV. 11, 1916.
1,286,318. Patented Dec. 3, 1918.
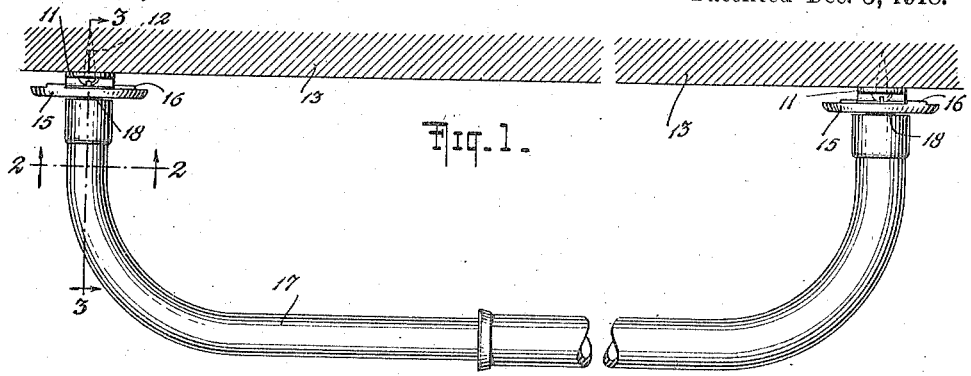
Fig. 1.
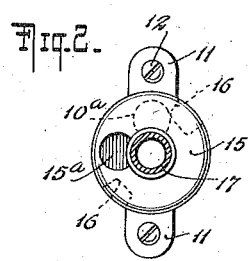
Fig. 2.
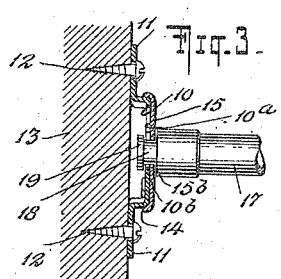
Fig. 3.
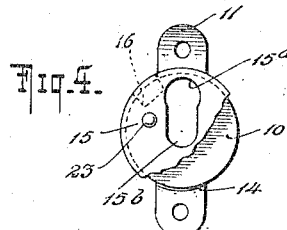
Fig. 4.
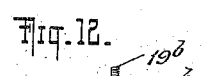
Fig. 12.
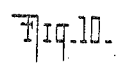
Fig. 5.
Fig. 10. Fig. 11.
Fig. 6.
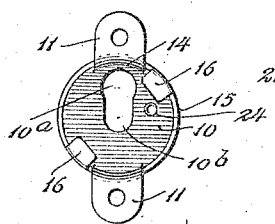
Fig. 7.
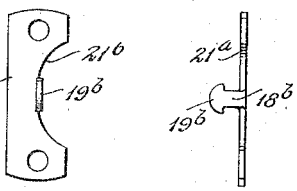
Fig. 8.
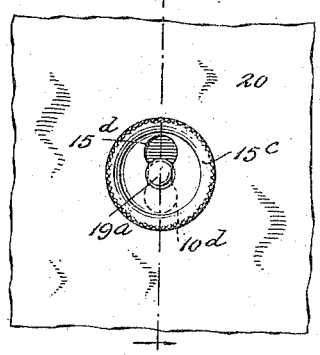
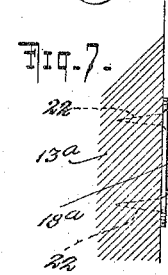
Fig. 9.
WITNESSES
George Du Bon
John A Kehlenbeck
INVENTOR
SIDNEY C. HILLS
BY
ATTORNEYS

UNITED STATES PATENT OFFICE.

SIDNEY C. HILLS, OF TORRINGTON, CONNECTICUT, ASSIGNOR TO THE TURNER & SEYMOUR MFG. CO., OF TORRINGTON, CONNECTICUT, A CORPORATION OF CONNECTICUT.

LOCKING DEVICE.

1,286,318.      Specification of Letters Patent.      Patented Dec. 3, 1918.

Application filed November 11, 1916. Serial No. 130,718.

*To all whom it may concern:*

Be it known that I, SIDNEY C. HILLS, a citizen of the United States, and resident of Torrington, county of Litchfield, State of Connecticut, have invented certain new and useful Improvements in Locking Devices, of which the following is a specification.

My invention relates to locking devices and has for its object to provide a simple construction whereby one element may be efficiently locked in operative connection with another element. For instance, in curtain fixtures my improvement may be utilized to provide a simple arrangement whereby the curtain rod may be efficiently locked upon the brackets; my invention further contemplates applying a similar simple arrangement to curtains and tops for automobiles and other vehicles and to curtains and shades of other types whereby said curtains, tops or shades may be efficiently locked in position. Other objects and purposes of my improvement will appear from the description hereinafter and the features of novelty will be pointed out in the appended claims.

Reference is to be had to the accompanying drawings which illustrate examples of my invention and its application and in which Figure 1 is a plan view of a curtain fixture; Fig. 2 is a section on the line 2—2 of Fig. 1; Fig. 3 is a section on the line 3—3 of Fig. 1; Fig. 4 is a face view of my improved locking device in the form of a bracket for curtain rods; Fig. 5 is a rear view thereof; Fig. 6 is a detail view showing my improvement adapted for use as a self-locking catch for vehicle curtains or tops; Fig. 7 is a section thereof on the line 7—7 of Fig. 6; Fig. 8 is a face view of the locking device; Fig. 9 is a rear view thereof; and Figs. 10, 11, 12 are detail views of another form of post adapted to be used therewith.

As shown in Figs. 1 to 5 inclusive the locking device by way of example is shown in the form of a bracket for curtain rods and comprises a disk-shaped section 10 from the periphery of which lugs 11 project radially outward at diametrically opposite points. The said lugs 11 may be provided with openings for the accommodation of screws or other fastening devices 12 whereby the brackets are fastened in position upon the casing 13 and are preferably bent as indicated at 14 so that, when the brackets are secured in operative position the sections 10 will be spaced from the casing as shown in Fig. 3. Each bracket further comprises a disk 15 mounted in surface engagement with the disk-shaped section 10 and preferably having its periphery overlapping that of the section 10 whereby the disk 15 is rotatable upon and relatively to said section 10 as is clearly shown in the drawings. For maintaining the disk 15 in proper coöperative relation to said section 10 and against separation therefrom, the disk 15 may be provided with integral projections or ears 16 which extend behind the section 10 and engage the rear surface thereof, said ears 16 preventing a separation of the sections 10 and disk 15 without interfering with the relative rotation of the latter. The disk-shaped section 10 and the disk 15 are provided with slots $10^a$ and $15^a$ respectively which are arranged to register with each other and are preferably though not necessarily of a keyhole shape as shown in Fig. 4, the inner ends $10^b$ and $15^b$ of said slots being in the form of arcs described about the common center of the sections 10 and disk 15 as also shown in said Fig. 4.

The curtain rod 17 which is intended for connection with the brackets so far described may comprise a single section of fixed length or sections telescopically combined in the usual manner whereby the length of the rod may be adjusted within certain limits. In either case the said rod 17 is provided at opposite ends with projections or studs 18 having heads 19 located at their free ends as shown in Fig. 3. The projections are constructed so as to fit into the inner end portions $10^b$ and $15^b$ of the slots $10^a$ and $15^a$ while the heads 19 are of a diameter adapted to readily pass through the enlarged outer ends of said slots but too great to pass through the inner end portions $10^b$ and $15^b$ thereof, it being understood that the diameter of the curtain rod at its ends is also greater than the width of said inner end portions $10^b$ and $15^b$. The distances between said heads and the ends of the rod 17 or in other words the length of the projections or studs 18 is such that when the rod is operatively connected with the brackets the ends of the rod will be in engagement with the outer faces of the disks 15 and the heads 19 will engage the rear surface of the disk-shaped section 10.

Assuming the brackets are properly secured upon a door, window or other casing 13 and it is desired to operatively combine the curtain rod therewith, the disks 15 are first rotated relatively to the disk-shaped sections 10 until the slots 15$^a$ of the latter are in registry with the slots 10$^a$ of said sections 10. The heads 19 may then be passed inwardly through the enlarged outer ends of said slots and after which the projections or studs 18 may be moved lengthwise of said slots until seated in the inner ends thereof. In this position the heads 19 are in engagement with the rear surfaces of the disk-shaped sections 10 and project transversely beyond the opposite sides of the portions 10$^b$ of the slots 10 while the end surfaces of the rod 17 similarly engage the outer faces of the disks 15. The rod 17 is thus firmly supported in operative position and may be locked against unintentional removal from said brackets by simply rotating the disks 15 relatively to the disk-shaped sections 10 a sufficient distance to bring the slots 10$^a$ and 15$^a$ of each bracket out of registry with each other. The degree of rotation is preferably such that the outer ends of the slots 10$^a$ are completely covered by solid portions of the disks 15 so that an accidental or unintentional disconnection of the rod 17 from the bracket is impossible. In other words the actuation of the disk 15 will form a closed central opening in each bracket for the accommodation of the projections 18 and through which it is impossible to force the head 19; at the same time access to the enlarged outer ends of the slots 10$^a$ and 15$^a$ will be cut off so that the curtain rod is securely connected with the brackets and locked thereon against any material movement in any direction. To permit the rod 17 to be disconnected from said brackets it is simply necessary to rotate the disks 15 sufficiently to again bring the slots or recesses 15$^a$ into registry with the slots or recesses 10$^a$ whereupon by moving the projections or studs 18 outwardly in said slots, the heads 19 may be readily withdrawn through the outer, enlarged ends of said slots.

In Figs. 6 to 9 I have shown another example of the many uses to which my improvement may be adapted. In these figures 20 designates a sheet of material which may represent a section of an automobile or other vehicle top or curtain, a part of a shade or any other covering or similar arrangement which in operation is intended to be detachably fastened to another element. Similarly 13$^a$ may represent part of an automobile or other vehicle, a section of a window or door casing or any other element. In the example under discussion the locking device also comprises a disk-shaped member 10$^c$ which is provided with lugs or prongs 11$^a$ which extend through and whereby said disk-shaped member 10$^c$ is secured to the material 20 so as to be carried thereby. The said lugs or prongs 11$^a$ extend from said disk-shaped member 10$^c$ at points within the periphery thereof, the purpose of which will be clear from the description hereinafter. Each locking device in the present case includes also a disk 15$^c$ mounted in surface engagement with the disk-shaped section 10$^c$ and preferably having its periphery overlapping and turned under the periphery of said disk-shaped section 10$^c$. With this arrangement the disk 15$^c$ which corresponds to the disk 15 of the form first described is rotatable upon and relatively to the disk-shaped section 10$^c$ corresponding to the section 10 hereinbefore mentioned in the same manner as in the example illustrated in Figs. 1 to 5 inclusive. The arrangement of the lugs 11$^a$ within the periphery of the section 10$^c$ prevents said lugs from interfering with the rotation of the disk 15$^c$.

The disk-shaped section 10$^c$ and the disk 15$^c$ are also provided with slots 10$^d$ and 15$^d$ which are arranged to be brought into and out of registry with each other by a movement of the disk 15$^d$ in the same way as in Figs. 1 to 5 and in the illustrated example are also of key-hole shape. The slots 10$^d$ and 15$^d$ may also be located on the member 10$^c$ and disk 15$^c$ respectively in the same way as in said figures; in the present illustration the material 20 is also provided with a slot or aperture located in registry with the slot 10$^d$ of the member 10$^c$.

The locking device at present being described is arranged to coöperate with a projection or stud 18$^a$ corresponding to the projection or stud 18 and likewise provided with a head 19$^a$ corresponding to the head 19, the projection 18$^a$ in the form shown in Figs. 6 and 7 comprising a stud or post which extends perpendicularly outward from a plate 21 adapted to be secured upon the element 13$^a$ in any suitable manner as by screws 22, said element as before stated being part of an automobile or other vehicle, or a window or other casing, etc. Instead of constructing the projection and head as shown in Figs. 6 and 7 the arrangement illustrated in Figs. 10, 11 and 12 may be followed. In this form the structure comprises a plate 21$^a$ cut out as at 21$^b$ and formed with an integral headed tongue bent at approximately right angles to said plate 21$^a$ to form a projection or stud 18$^b$ having the head 19$^b$. In other words this form may be stamped from sheet metal and then bent to the required shape, the plate 21$^a$ being provided with suitable openings for the accommodation of screws 22 or other fastening means whereby said plate is secured upon the element 13ª.

The method of connecting and disconnecting the locking device and the projection is the same as in Figs. 1 to 5 and is accomplished by actuating the disk 15ᶜ relatively to the disk-shaped section 10ᶜ in exactly the same way as described with respect to said figures. The embodiment at present being described also possesses all of the advantages of the example first referred to herein. It will be noted that in the forms shown in Figs. 6 to 12 the projection or stud 18ª or 18ᵇ as the case may be, when operatively combined with the locking device extends through the slot 20ª of the material 20, in addition to passing through the slots 10ᵈ and 15ᵈ.

When my improvement is in use the projection of whatever nature the same may be or wherever the same may be located will be held against unintentional disconnection from the locking device either by a force exerted in the direction of the axis of the projection or by a force exerted in the direction of the diameter for instance of the disks 15 and 15ᶜ. Thus in both of the illustrated examples of my invention it will be apparent that any strain or stress which may be exerted by the curtain rod on the one hand and by the material 20 or the projection or stud 18ª on the other hand can have no effect tending to open the locking device or break the operative connection between said locking device and its coöperating projection.

If desired the locking device, as an additional precaution against accidental opening, may be provided with any suitable means for locking the disk 15 or 15ᶜ against unintentional rotation relatively to the disk-shaped section 10 or 10ᶜ. For instance a recess or depression 22 may be formed in the outer face of the disk-shaped section 10 or 10ᶜ and a coöperating projection 23 located upon the adjacent or inner face of the disk 15 or 15ᶜ, the said recess and projection being so located upon the device as to be in engagement when the disk 15 or 15ᶜ is in its locking position. In other words when the projection 22 is located in the recess 21 a force sufficient to remove the projection from said recess will have to be exerted upon the disk 15 or 15ᶜ before it can be rotated relatively to the disk-shaped section 10 or 10ᶜ. It will of course be evident that the location of the recess and projection with respect to the disk-shaped section and the disk may be reversed without affecting the efficient operation thereof and also that other suitable means may be provided for securing the same result. In some cases additional means may be provided for arresting the movement of the disk 15 or 15ᶜ when the slots 15ª, 15ᵈ thereof are in registry with the slots 10ª and 10ᵈ of the disk-shaped sections 10 and 10ᶜ. Furthermore the said slots may be differently shaped than illustrated, the same being true of the projections; it is further to be understood that equivalent devices may be substituted for the projections and slots; the form shown and described simply being examples for the purpose of illustration and description.

The device is extremely simple in construction and efficient in operation and may be efficiently utilized in many ways other than those selected for illustrative purposes.

It will of course be obvious, when my improved locking device forms part of a curtain fixture, that it may be used for supporting curtain rods which are straight throughout or otherwise shaped than in the illustrated example.

Various changes in the specific forms shown and described may be made within the scope of the claims without departing from the spirit of my invention.

I claim:

1. The combination of a circular plate provided with a key-hole slot located entirely within its periphery, the outer end of said slot being its largest portion, means carried by said plate for securing it in operative position, a disk located in surface engagement with said plate and provided with a key-hole slot located entirely within its periphery, the outer end of said slot being its largest portion, said disk being rotatable upon said plate to move said slots into and out of registry with each other, peripheral means whereby said plate and disk are maintained in coöperative relation and a stud having a head arranged to pass in an axial direction through the registering largest portions of said slots and of a size greater than the smaller portions thereof.

2. The combination of a circular plate provided with a key-hole slot located entirely within its periphery, the outer end of said slot being its largest portion, a sheet-like element having a key-hole slot located entirely within its boundaries in registry with the slot of said plate, means for securing said plate in surface engagement with said element, a disk located in surface engagement with said plate and provided with a key-hole slot located entirely within its periphery, the outer end of said last named slot being its largest portion, said disk being rotatable on said plate to move its slot into and out of registry with the slots of said plate and element, peripheral means whereby said plate and disk are maintained in coöperative relation, and a stud having a head arranged to pass, in an axial direction through the registering largest portions of said slots and of a size greater than the smaller portions thereof.

3. The combination of a plate cut away at an intermediate portion, an integral stud bent outwardly at said cut-out portion and extending substantially perpendicular to said plate, an integral head at the free end of said stud, a disk-shaped member having a slot through which said stud extends, and a disk rotatably mounted in surface engagement with said member, said disk being rotatable to move its slot into and out of registry with the first named slot whereby said stud is locked against removel from said member or released.

In testimony whereof I have hereunto set my hand.

SIDNEY C. HILLS.

Copies of this patent may be obtained for five cents each, by addressing the "Commissioner of Patents. Washington, D. C."